(12) United States Patent
Shiozaki et al.

(10) Patent No.: US 6,550,596 B2
(45) Date of Patent: Apr. 22, 2003

(54) EXTERNALLY CONTROLLED FAN COUPLING DEVICE

(75) Inventors: Ken Shiozaki, Susono (JP); Eiji Watanabe, Tagata-gun (JP); Yoshinobu Iida, Numaru (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

(21) Appl. No.: 09/891,447

(22) Filed: Jun. 26, 2001

(65) Prior Publication Data

US 2002/0003075 A1 Jan. 10, 2002

(30) Foreign Application Priority Data

Jun. 29, 2000 (JP) ......................................... 2000-196653

(51) Int. Cl.$^7$ .............................................. F16D 35/02
(52) U.S. Cl. .................................. 192/58.61; 192/84.31
(58) Field of Search ............................ 192/58.61, 58.8, 192/84.31; 251/129.16

(56) References Cited

U.S. PATENT DOCUMENTS

| | | |
|---|---|---|
| 2,879,755 A | 3/1959 | Weir |
| 2,988,188 A | 6/1961 | Tauschek |
| 3,059,745 A | 10/1962 | Tauschek |
| 3,217,849 A | 11/1965 | Weir |
| 3,259,221 A | 7/1966 | Godfrey |
| 3,272,188 A | 9/1966 | Sabat |
| 3,430,743 A | 3/1969 | Fujita et al. |
| 3,463,282 A | 8/1969 | Fujita et al. |
| 3,642,105 A | 2/1972 | Kikuchi |
| 3,727,354 A | 4/1973 | La Flame |
| 3,840,101 A | 10/1974 | Peter et al. |
| 3,856,122 A | 12/1974 | Leichliter |
| 3,893,555 A | 7/1975 | Elmer |
| 3,964,582 A | 6/1976 | Mitchell |
| 4,036,339 A * | 7/1977 | Kikuchi ............... 192/58.61 |
| 4,238,016 A | 12/1980 | Yoshida et al. |
| 4,270,641 A * | 6/1981 | Nonnenmann et al. .. 192/58.61 |
| 4,281,750 A | 8/1981 | Clancey |
| 4,403,684 A | 9/1983 | Haeck |
| 4,505,367 A | 3/1985 | Martin |
| 4,629,046 A | 12/1986 | Martin |
| 4,665,694 A | 5/1987 | Brunken |
| 4,667,791 A | 5/1987 | Martin et al. |
| 4,685,549 A | 8/1987 | Brunken et al. |
| 4,699,258 A | 10/1987 | Johnston et al. |
| 4,796,571 A | 1/1989 | Ono et al. |

(List continued on next page.)

FOREIGN PATENT DOCUMENTS

| | | |
|---|---|---|
| JP | 54-25581 | 8/1979 |
| JP | 55-76226 | 6/1980 |
| JP | 57-1829 | 1/1982 |
| JP | 57-167533 | 10/1982 |
| JP | 57-179431 | 11/1982 |
| JP | 59-27452 | 7/1984 |
| JP | 62-124330 | 6/1987 |
| JP | 62-194038 | 8/1987 |
| JP | 63-182332 | 11/1988 |

*Primary Examiner*—Saul Rodriguez
(74) *Attorney, Agent, or Firm*—Gerald E Hespos; Anthony J. Casella

(57) ABSTRACT

In a fan coupling device in which the interior of a sealed housing supported and born by a rotary shaft having a driving disc secured thereto is separated by a partition plate having an oil supply adjusting hole into an oil reservoir and a torque transmission chamber in which the driving disc is contained and in which driving torque is transmitted to a driven side by oil supplied to the torque transmission chamber, a non-excited electromagnet utilizing a permanent magnet located in the oil reservoir of the sealed housing being supported around the rotary shaft, the valve member being actuated by the electromagnet to provide a mechanism for controlling the opening and closing of the oil supply adjusting hole.

8 Claims, 18 Drawing Sheets

U.S. PATENT DOCUMENTS

| | | |
|---|---|---|
| 4,846,331 A | 7/1989 | Ono |
| 4,850,465 A | 7/1989 | Ono |
| 4,903,643 A | 2/1990 | Takikawa et al. |
| 4,903,850 A | 2/1990 | Ono |
| 4,930,458 A | 6/1990 | Takikawa et al. |
| 5,004,085 A | 4/1991 | Taureg |
| 5,018,612 A | 5/1991 | Takikawa et al. |
| 5,060,774 A | 10/1991 | Takikawa et al. |
| 5,090,533 A | 2/1992 | Inoue |
| 5,101,949 A | 4/1992 | Takikawa et al. |
| 5,109,965 A | 5/1992 | Inoue |
| 5,119,920 A | 6/1992 | Inoue |
| 5,125,491 A | 6/1992 | Takikawa et al. |
| 5,139,125 A | 8/1992 | Takikawa et al. |
| 5,232,074 A | 8/1993 | Watanabe |
| 5,452,782 A | 9/1995 | Inoue |
| 5,501,183 A | 3/1996 | Takayama |
| 5,575,368 A | 11/1996 | Kikuchi et al. |
| 5,797,749 A | 8/1998 | Ryuu |
| 5,881,857 A | 3/1999 | Ryuu |
| 5,893,441 A * | 4/1999 | Reeb ................. 192/58.43 |
| 5,937,983 A * | 8/1999 | Martin et al. ........... 192/58.61 |
| 6,032,775 A * | 3/2000 | Martin ................. 192/113.21 |
| 6,125,981 A | 12/2000 | Ito et al. |
| 6,247,567 B1 | 6/2001 | Watanabe |

\* cited by examiner

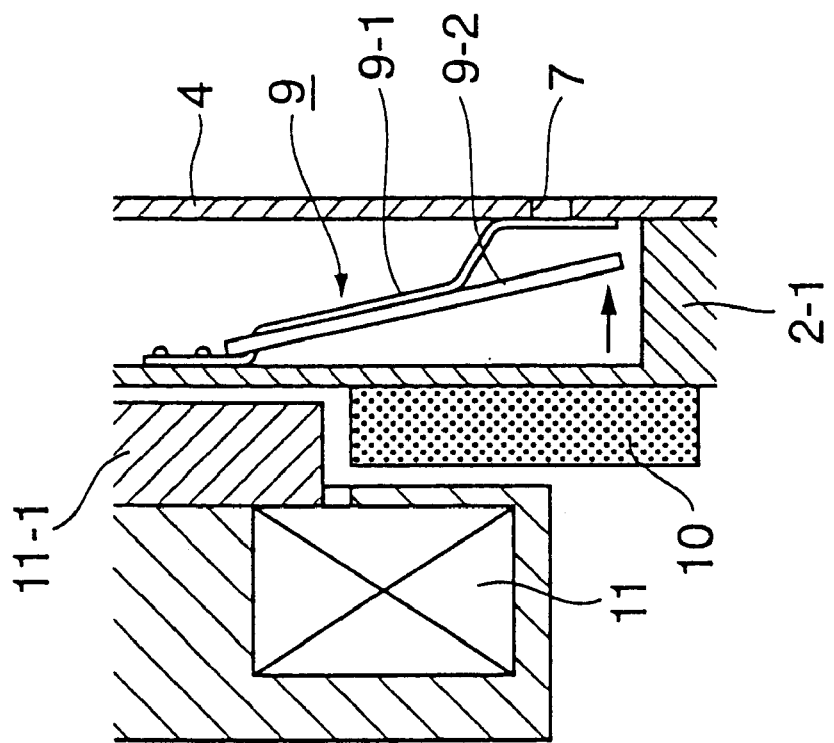
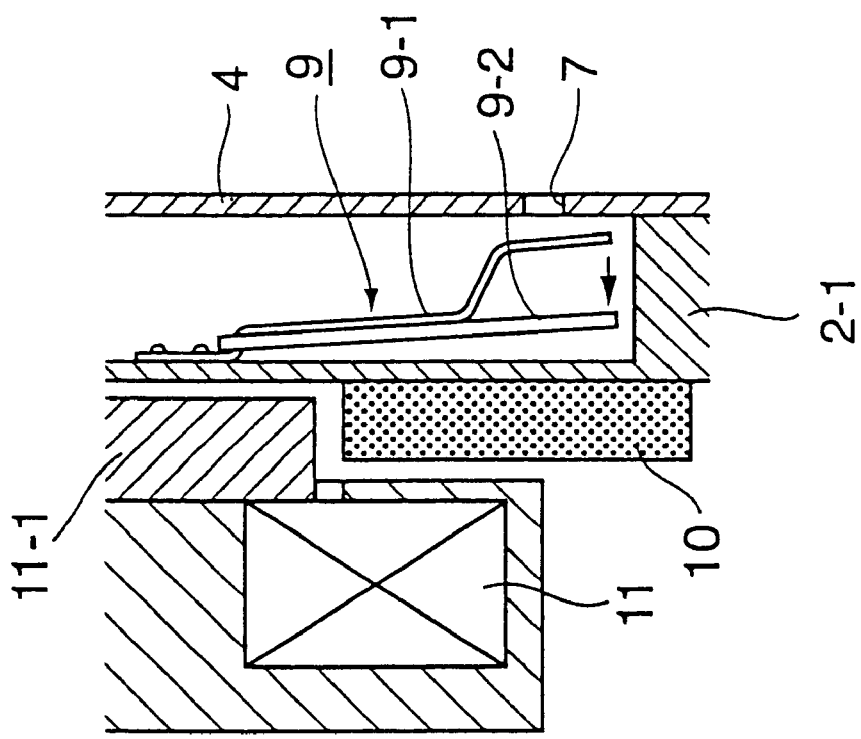
Fig. 3 (a)
Fig. 3 (b)

SINGLE VALVE STRUCTURE

DOUBLE VALVE STRUCTURE

Fig. 1 1 (a)
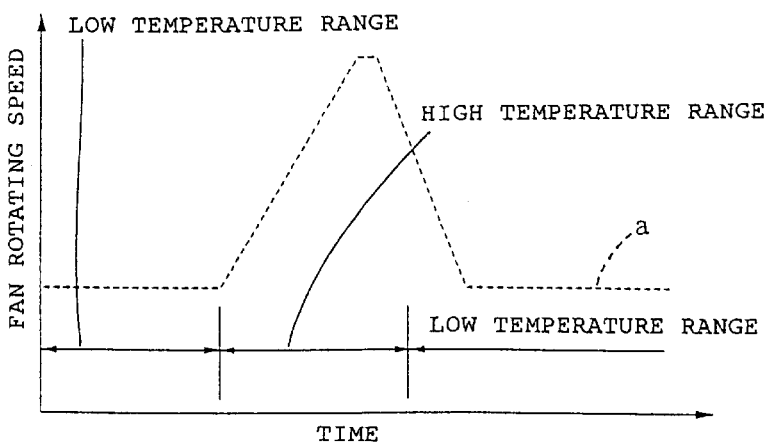
DOUBLE VALVE STRUCTURE (ONLY OIL SUPPLY ADJUSTING HOLE 7-1 IN FIG. 10 IS OPENED)
Fig. 1 1 (b)
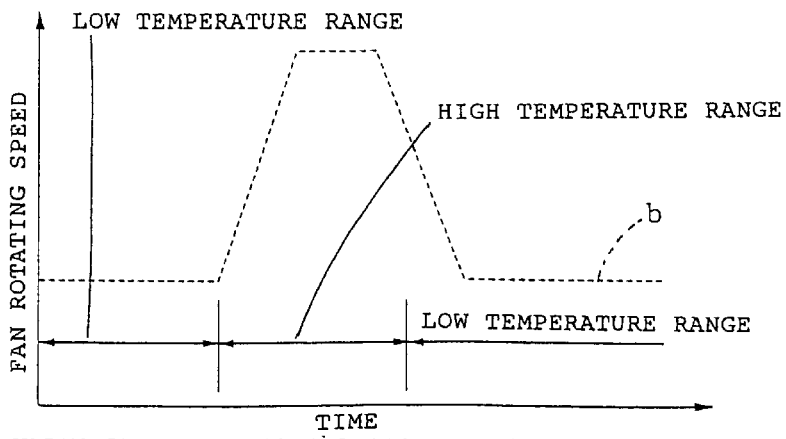
DOUBLE VALVE STRUCTURE (OIL SUPPLY ADJUSTING HOLES 7-1 AND 7-2 IN FIG. 10 ARE OPENED)

EXTERNALLY CONTROLLED FAN COUPLING DEVICE

BACKGROUND OF THE INVENTION

1. Field of the Invention

The present invention generally relates to externally controlled fan coupling devices for controlling the rotation speed of a fan for cooling an engine of an automobile or the like in accordance with changes in the ambient temperature or changes in the rotation.

2. Description of the Prior Art

There is a conventional fan coupling device of this type in which the interior of a sealed housing constituted by a case and a cover is separated by a partition plate having an oil supply adjusting hole into an oil reservoir and a torque transmission chamber having a driving disk contained therein; a dam and a circulation channel contiguous to the dam that establishes communication from the torque transmission chamber to the oil reservoir are formed on a part of an inner circumferential wall of the sealed housing opposite to an outer circumferential wall of the driving disc on which oil collects during rotation; and a valve member is provided for opening the supply adjusting hole on the partition plate when the ambient temperature exceeds a set value and for closing the supply adjusting hole of the partition plate when the temperature is equal to or lower than the set value to control the transmission of torque from the driving side to the driven side of the sealed housing by increasing and decreasing an effective contact surface of oil at a torque transmitting gap provided between the driving disc and a wall of the sealed housing opposite thereto located in the vicinity of the exterior thereof. A pair of electromagnets are provided on a front surface or rear surface of the sealed housing; a magnetic valve member for opening and closing the supply adjusting hole is provided opposite to one of the electromagnets; and a magnetic sub valve member for opening and closing the circulation channel is provided opposite to the other electromagnet (see Japanese patent No. 2911623).

In general, such a conventional externally controlled fan coupling device has problems in that it has a complicated mechanism, consumes great power, and results in a high cost because it is primarily electrically controlled and in that the fan coupling device can be damaged because of disablement of circulation of operating oil due to a failure of the electrical system. However, since an externally controlled fan coupling device is advantageous in that controlling factors such as the water temperature, the engine speed, and auxiliary devices such as an air conditioner can be arbitrarily selected and in that adequate fan control can be performed, demands have existed for improvements for solving the above-described problems.

The invention has been made taking such a situation into consideration, and it is an object of the invention to provide an externally controlled fan coupling device which has a simple mechanism to allow saving of power consumption, which has a "safety on" function (a function of allowing operating oil to be circulated without being stopped even in the case of a failure of an electrical system) and which can freely and properly control the rotation speed of a fan by accurately adjusting the amount of oil in accordance with various operating conditions.

SUMMARY OF THE INVENTION

The present invention basically employs a method in which a valve member for opening and closing an oil supply adjusting hole for supplying operating oil from an oil reservoir to a torque transmission chamber is controlled by a non-excited electromagnet that utilizes a permanent magnet. In principle, there is provided a fan coupling device in which the interior of a sealed housing constituted by a case supported and born by a rotary shaft body having a driving disc secured to an end thereof through a bearing and a cover attached to the case is separated by a partition plate having an oil supply adjusting hole into an oil reservoir and a torque transmission chamber having the driving disc contained therein; a dam and a circulation channel contiguous to the dam that establishes communication from the torque transmission chamber to the oil reservoir are formed on a part of an inner circumferential wall of the sealed housing opposite to an outer circumferential wall of the driving disc on which oil collects during rotation; and a valve member is provided in the oil reservoir for opening and closing the oil supply adjusting hole to control the transmission of rotation torque from a driving side to a driven side by increasing and decreasing an effective contact surface of oil at a torque transmitting gap defined by the driving side and the driven side, characterized in that a non-excited electromagnet utilizing a permanent magnet located in the oil reservoir of the sealed housing is supported around the rotary shaft body through a bearing to actuate the valve member with the electromagnet, thereby providing a mechanism for controlling the opening and closing of the oil supply adjusting hole.

The invention is also characterized in that a plurality of the oil supply adjusting holes are provided to form a double valve structure in which a valve member is provided for each of the oil supply adjusting holes.

The permanent magnet may be attached to either the sealed housing or electromagnet or to both of the sealed housing and electromagnet. The valve member may be constituted by a plate spring and a magnetic piece, and it may alternatively be constituted by a coil spring and a magnetic piece. Further, the invention is characterized in that the case may be made of a non-magnetic material.

According to the invention, the mechanism for controlling the opening and closing of the valve member which employs a system for controlling the opening and closing of the oil supply hole using the non-excited electromagnet utilizing a permanent magnet has the same principle as that of a common non-excited actuation valve. According to the principle, when a current is applied to the electromagnet to generate a magnetic field in a direction opposite to that of a magnetic field generated by the permanent magnet, the magnetic field of the permanent magnet is cancelled, and the attracting force of the permanent magnet is extinguished, which provides a mechanism for closing the oil supply adjusting hole by urging the valve member against the partition plate through the action of the spring and for opening the oil supply adjusting hole by turning the electromagnet off to attract the valve member toward the permanent magnet against the spring.

By applying a current to the electromagnet to generate a magnetic field in the same direction as that of a magnetic field generated by the permanent magnet, the oil supply hole can be instantaneously opened as a result of a synergistic effect of the attracting force of the permanent magnet and the attracting force of the electromagnet.

Therefore, the use of the opening/closing control mechanism makes it possible to maintain a "safety on" state or a state in which the oil supply adjusting hole provided on the partition plate is kept open even when the electromagnet is turned off due to a failure of the electrical system, which allows the operating oil to be circulated, keeps the fan coupling device on to cause the fan to continue rotating, and makes it possible to prevent damage to the engine due to overheating.

When a plurality of the oil supply adjusting holes are provided to form a double valve structure, the magnitude of the current for energizing the electromagnet may be varied stepwise to open and close each of the valves stepwise, which makes it possible to increase the rotating speed of the fan stepwise or to change the rate of the speed increase.

The case is made of a non-magnetic material to prevent leakage of magnetic flux. In the case of a case made of iron, a part of the case is cut off to prevent leakage of magnetic flux, and the same part is sealed with a sealant.

BRIEF DESCRIPTION OF THE DRAWINGS

FIGS. 3A and 3B are illustrations showing opening and closing operations of a valve member of the same device. FIG. 3A shows a state in which an oil supply adjusting hole is opened by turning an electromagnet off by applying a current to the electromagnet to generate a magnetic field in the same direction as that of a magnetic field generated by a permanent magnet, and FIG. 3B shows a state in which the oil supply adjusting hole is closed by applying a current to the electromagnet to generate a magnetic field in a direction opposite to that of the magnetic field generated by the permanent magnet.

FIG. 9A is a characteristic diagram of the single valve structure, and FIG. 9B is a characteristic diagram of the double valve structure.

FIGS. 11A and 11B are characteristic diagrams that are comparative illustrations of relationships between fan rotation speed and time in the double valve structure shown in FIG. 10. FIG. 11A is a characteristic diagram obtained when only an oil supply adjusting valve having a smaller diameter is opened, and FIG. 11B is a characteristic diagram obtained when both of two oil supply adjusting valves having smaller and larger diameters are opened.

FIG. 12A is a diagram showing a relationship between the rotating speed of the driving shaft (engine side) and the rotating speed of the fan during control for achieving rotating speeds in three steps; FIG. 12B shows a relationship between the rotating speed of the driving shaft and the rotating speed of the fan during control for achieving medium rotating speeds; FIG. 12C shows a relationship between the rotating speed of the driving shaft and the rotating speed of the fan during control for achieving an arbitrary rotating speed.

DETAILED DESCRIPTION OF PREFERRED EMBODIMENTS

In the present embodiment, 1 represents a driving shaft; 2 represents a sealed housing; 2-1 represents a case; 2—2 represents a cover; 3 represents a driving disc; 4 represents a partition plate; 5 represents an oil reservoir; 6 represents a torque transmission chamber; 7 represents an oil supply adjusting hole; 8 represents a circulation channel; 9 represents a valve member; 9-1 represents a plate spring; 9-2 and 19-2 represent magnetic pieces; 10 represents a permanent magnet; 11 represents an electromagnet; 12 represents an electromagnet supporting body; 13 and 14 represent bearings; 15 represents a dam; and 19-1 represents a coil spring.

Figure 1:
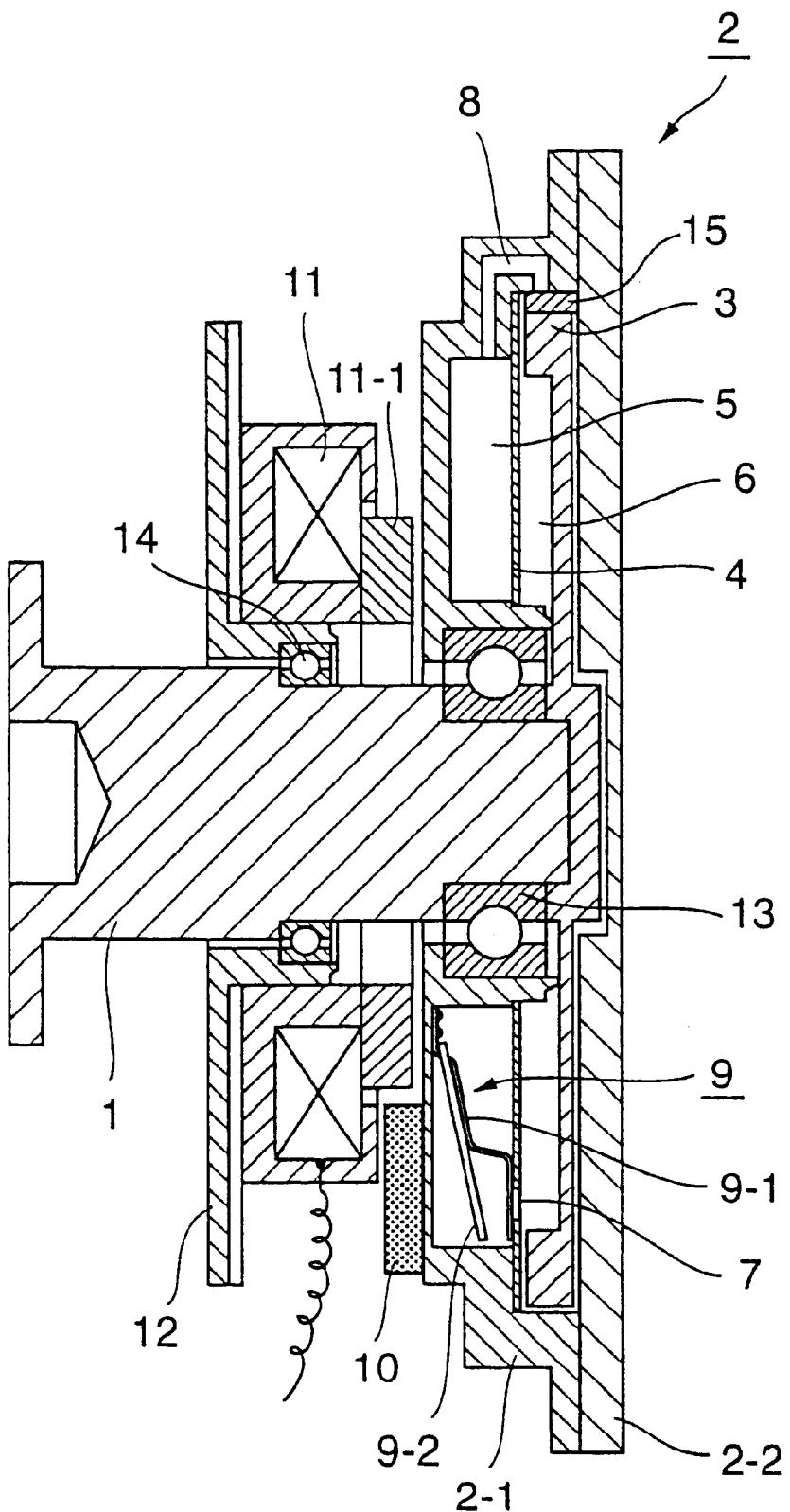
FIG. 1 is a vertical sectional view of an embodiment of an externally controlled fan coupling device according to the invention.
Figure 2:
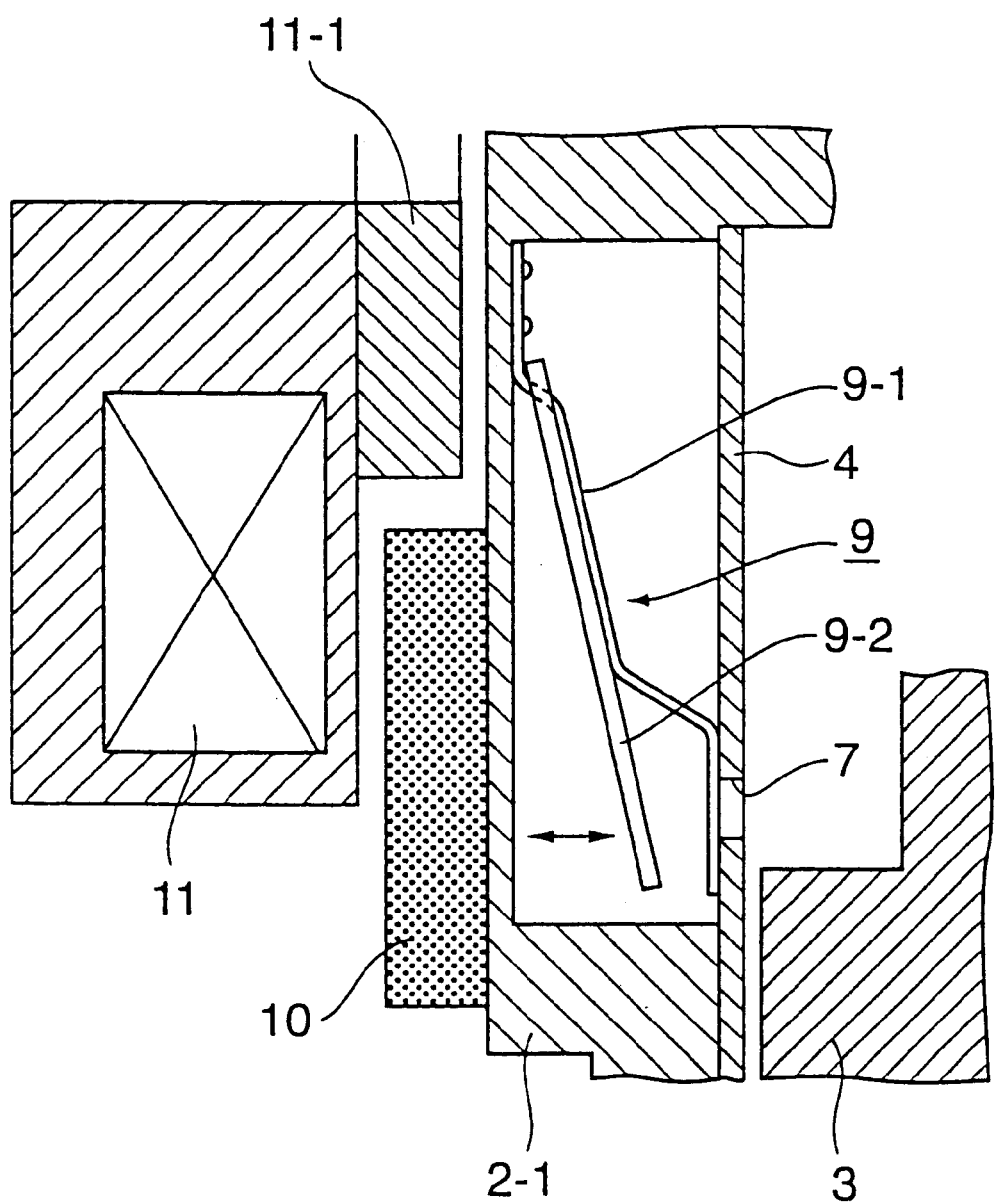
FIG. 2 is an enlarged vertical sectional view of a major part of the same device.

In the externally controlled fan coupling device (single valve structure) shown in FIG. 1, a sealed housing 2 constituted by a case 2-1 and a cover 2—2 is supported around a rotary shaft body (driving shaft) 1 through a bearing 13, the driving shaft 1 being driven by a driving section (engine) for rotation; the interior of the sealed housing 2 is separated by a partition plate 4 having an oil supply adjusting hole 7 into an oil reservoir 5 and a torque transmission chamber 6; and a driving disc 3 secured to an end of the rotary shaft body 1 is contained in the torque transmission channel 6 such that a torque transmitting gap is formed between the disc and an inner circumferential surface of the torque transmission chamber.

A valve member 9 for opening and closing the oil supply adjusting hole 7 is constituted by a plate spring 9-1 and a magnetic piece 9-2, and it has a mechanism for opening and closing the oil supply adjusting hole 7 provided on the partition plate 4 with the plate spring 9-1 which is secured to an inner wall of an oil reservoir 5 at a base section thereof and to which a force toward the partition plate 4 is continually applied.

In the driving section side of the sealed housing 2, an electromagnet 11 is supported on an electromagnet supporting body 12 which is supported and born by a rotary shaft body 1 through a bearing 14, and a permanent magnet 10 which is paired with the electromagnet 11 is attached to an outer surface of the case 2-1 in a face-to-face relationship with the valve member 9. 11-1 represents a ring-shaped magnetic material. That is, when a current is applied to the electromagnet 11 to generate a magnetic field in a direction opposite to that of a magnetic field generated by the permanent magnet 10, the magnetic field of the permanent magnet 10 is cancelled. As a result, the attracting force of the permanent magnet 10 is extinguished, and the valve member 9 is urged against the partition plate 4 by the action of the plate spring 9-1 to close the oil supply adjusting hole 7. When the electromagnet 11 is turned off or when a current is applied to the electromagnet 11 to generate a magnetic field in the same direction as that of a magnetic field generated by the permanent magnet 10, the valve member 9 is attracted toward the permanent magnet 10 against the plate spring 9-1 to open the oil supply adjusting hole 7.

In the fan coupling device having the above-described configuration, when the electromagnet 11 is turned off or when a current is applied to the electromagnet 11 to generate a magnetic field in the same direction as that of a magnetic field generated by the permanent magnet 10, a magnetic piece 9-2 of the valve member 9 is attracted against the plate spring 9-1 as a result of the action of the permanent magnet 10 as shown in FIG. 3A to open the oil supply adjusting hole 7 and to maintain the open state. As a result, oil in the oil reservoir 5 is supplied to the torque transmission chamber 6 through the oil supply adjusting hole 7 on the partition plate 4. The oil supplied to the torque transmission chamber 6 transmits driving torque of the driving disc 3 to the case 2-1 to increase the rotating speed of a cooling fan (not shown) attached to the case.

When a current is applied to the electromagnet 11 to generate a magnetic field in a direction opposite to that of the magnetic field generated by the permanent magnet 10, since the attracting force of the permanent magnet 10 is extinguished because the magnetic fields of the permanent magnet 10 and electromagnet 11 are cancelled by each other as shown in FIG. 3B, the valve member 9 is urged against the partition plate 4 by the force of the plate spring 9-1 to close the oil supply adjusting hole 7 and to maintain the closed state. As a result, the supply of oil from the oil reservoir 5 to the torque transmission chamber 6 is stopped, and the oil in the torque transmission chamber 6 is returned by a dam 15 to the oil reservoir 5 through a circulation channel 8, which decreases the torque transmission rate and reduces the rotating speed of the case 2-1, thereby reducing the speed of the cooling fan.

Figure 4:
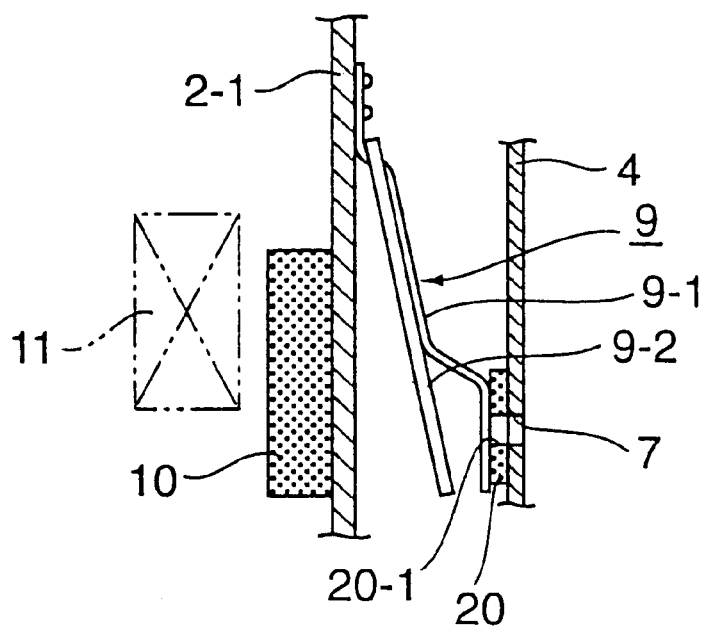
FIG. 4 is a vertical sectional view of a major part of another embodiment of an externally controlled fan coupling device according to the invention.
Figure 5:
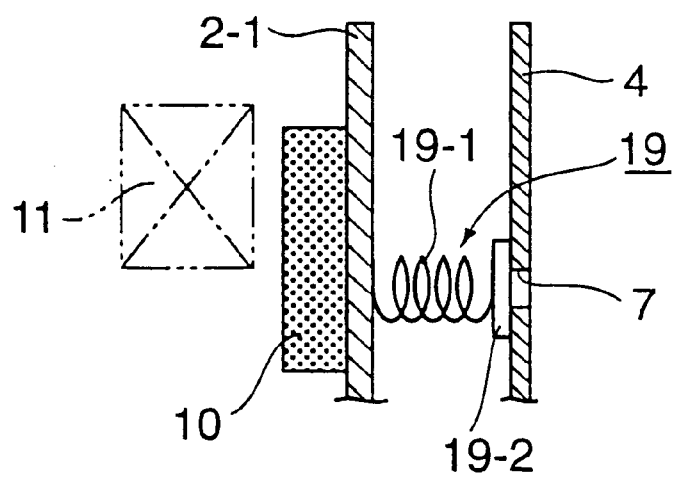
FIG. 5 is a vertical sectional view of a major part of still another embodiment of an externally controlled fan coupling device according to the invention.
Figure 6:
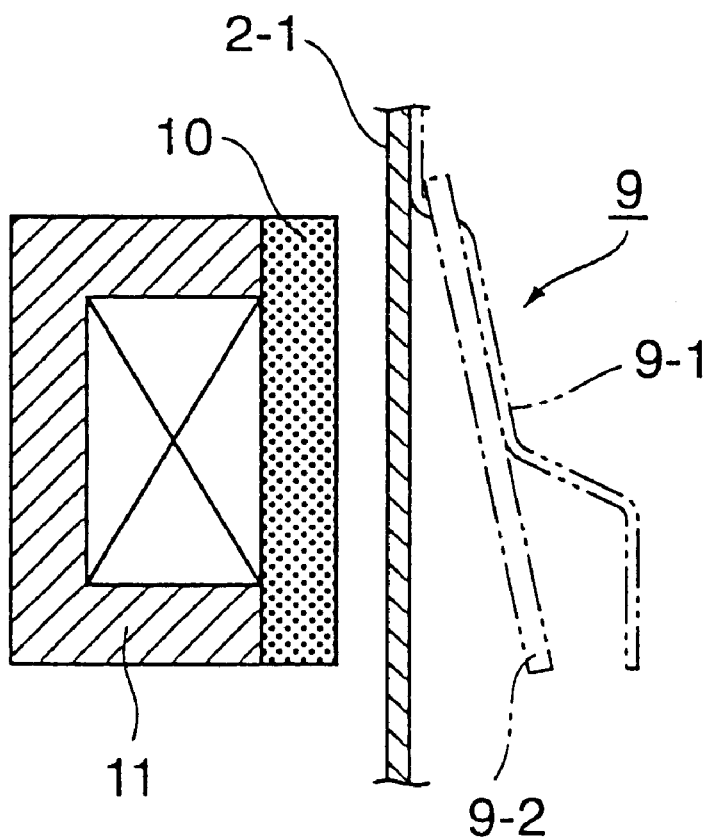
FIG. 6 is a vertical sectional view of a major part of still another embodiment of an externally controlled fan coupling device according to the invention.

Referring to other embodiments of the invention shown in FIGS. 4 through 6, the fan coupling device shown in FIG. 4 has a configuration in which the mechanism for controlling the opening and closing of the oil supply adjusting hole 7 by actuating the valve member 9 using the electromagnet 11 includes a permanent magnet 20 having an oil supply hole 20-1 attached to the partition plate 4 in order to assist the opening and closing of the valve member 9 and the retention of the open and closed states. In this case, the attracting force of the permanent magnet 20 is smaller than that of the permanent magnet 10 that is combined with the electromagnet 11.

In this fan coupling device, when a current is applied to the electromagnet 11 to generate a magnetic field in a direction opposite to that of a magnetic field generated by the permanent magnet 10, the magnetic fields of the permanent magnet 10 and electromagnet 11 are cancelled by each other as described above to extinguish the attracting force of the permanent magnet 10. As a result, the valve member 9 is urged against the partition plate 4 by the force of the plate spring 9-1 to close the oil supply adjusting hole 7 and, at the same time, the plate spring 9-1 is attracted by the permanent magnet 20 provided on the partition plate 4, which allows the oil supply adjusting hole 7 to be closed with improved reliability and assists the retention of the closed state. When the electromagnet 11 is turned off or when a current is applied to the electromagnet 11 to generate a magnetic field in the same direction as that of a magnetic field generated by the permanent magnet 10, a magnetic piece 9-2 of the valve member 9 is attracted by the action of the permanent magnet 10 which is provided on the case 2-1 against the attracting force of the permanent magnet 20 to open the oil supply adjusting hole 7.

In the fan coupling device shown in FIG. 5, a valve member 19 is formed by a coil spring 19-1 and a magnetic piece 19-2 as means for opening and closing the oil supply adjusting hole 7 provided on the partition plate 4. In this case, when a current is applied to the electromagnet 11 to generate a magnetic field in a direction opposite to that of a magnetic field generated by the permanent magnet 10, the magnetic fields of the permanent magnet 10 and electromagnet 11 are cancelled by each other as described above to extinguish the attracting force of the permanent magnet 10. As a result, the magnetic piece 19-2 is urged against the partition plate 4 by the action of the coil spring 19-1 to close the oil supply adjusting hole 7. When the electromagnet 11 is turned off or when a current is applied to the electromagnet 11 to generate a magnetic field in the same direction as that of the magnetic field generated by the permanent magnet 10, the magnetic pieces 19-2 of the valve member 19 is attracted by the action of the permanent magnet 10 against the coil spring 19-1 to open the oil supply hole 7.

The fan coupling device shown in FIG. 6 represents an example in which the permanent magnet 10 is provided on the same side as the electromagnet 11. In this case, the permanent magnet 10 and electromagnet 11 are integrally attached to the electromagnet supporting body 12. In such a configuration, when a current is applied to the electromagnet 11 to generate a magnetic field in a direction opposite to that of a magnetic field generated by the permanent magnet 10, the magnetic fields of the permanent magnet 10 and electromagnet 11 are cancelled by each other to extinguish the attracting force of the permanent magnet 10 in the same manner as that as in the configuration shown in FIG. 1. As a result, the magnetic piece 9-2 is urged against the partition plate 4 by the action of the plate spring 9-1 to close the oil supply adjusting hole 7. When the electromagnet 11 is turned off or when a current is applied to the electromagnet 11 to generate a magnetic field in the same direction as that of the magnetic field generated by the permanent 10, the magnetic piece 19-2 of the valve member 19 is attracted by the action of the permanent magnet 10 against the plate spring 9-1 to open the oil supply adjusting hole 7.

Figure 7:
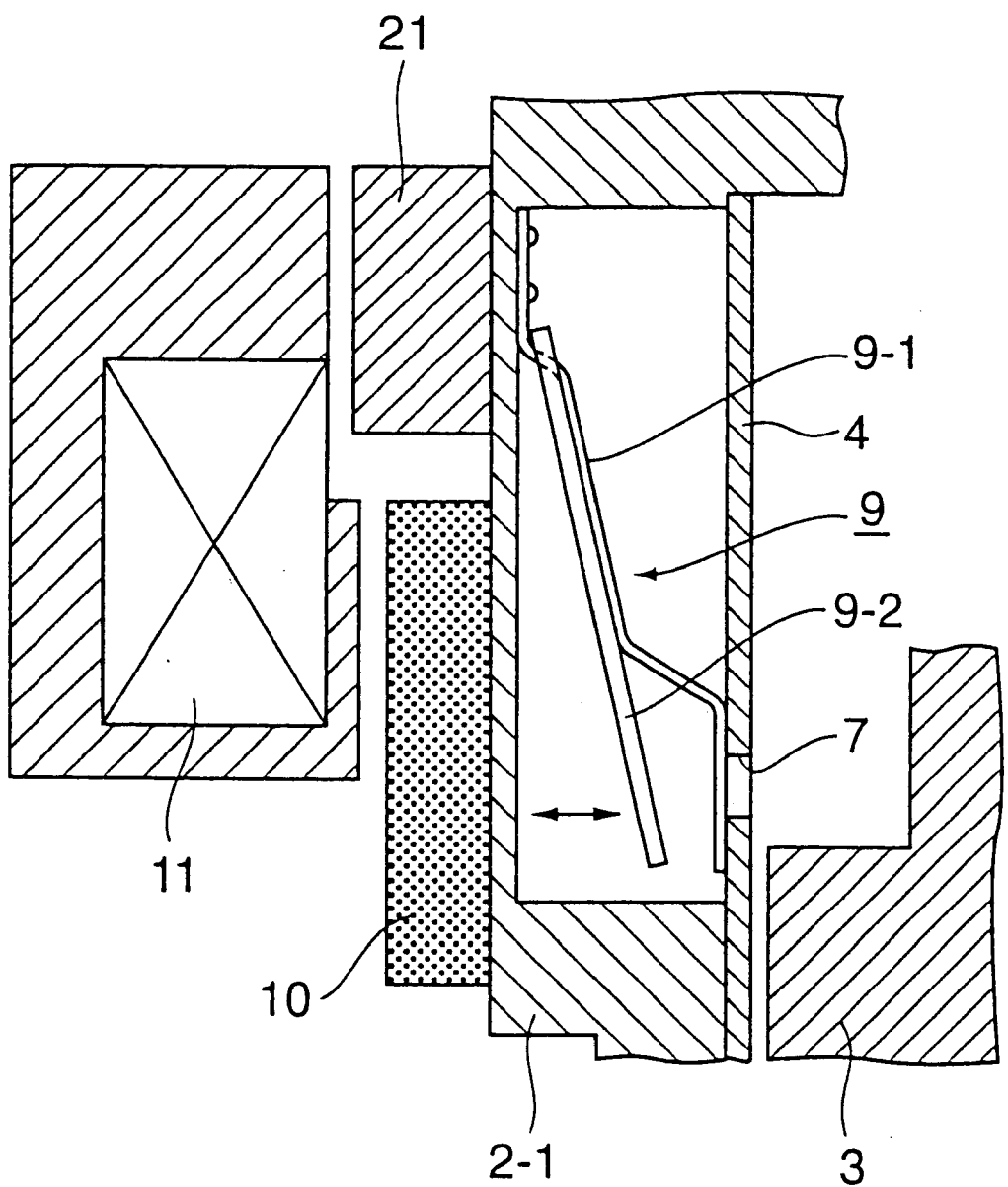
FIG. 7 is a vertical sectional view of a major part of still another embodiment of an externally controlled fan coupling device according to the invention.

The fan coupling device shown in FIG. 7 represents an example in which a magnetic body 21 having a block-like configuration instead of a ring-like configuration and having a width similar to that of the ring-shaped magnetic material 11-1 is provided on the case 2-1 of the sealed housing 2. The magnetic body 21 may be provided on the rear surface of the case 2-1 around the driving shaft 1 (see FIG. 1). In this case, when a current is applied to the electromagnet 11 to generate a magnetic field in a direction opposite to that of a magnetic field generated by the permanent magnet 10, the magnetic fields of the permanent magnet 10 and electromagnet 11 are cancelled by each other to extinguish the attracting force of the permanent magnet 10. As a result, the magnetic piece 9-2 is urged against the partition plate 4 by the action of the plate spring 9-1 to close the oil supply adjusting hole 7. When the electromagnet 11 is turned off or when a current is applied to the electromagnet 11 to generate a magnetic field in the same direction as that of the magnetic field generated by the permanent magnet 10, the magnetic piece 9-2 of the valve member 9 is attracted by the action of the permanent magnet 10 against the plate spring 9-1 to open the oil supply adjusting hole 7.

Figure 8:
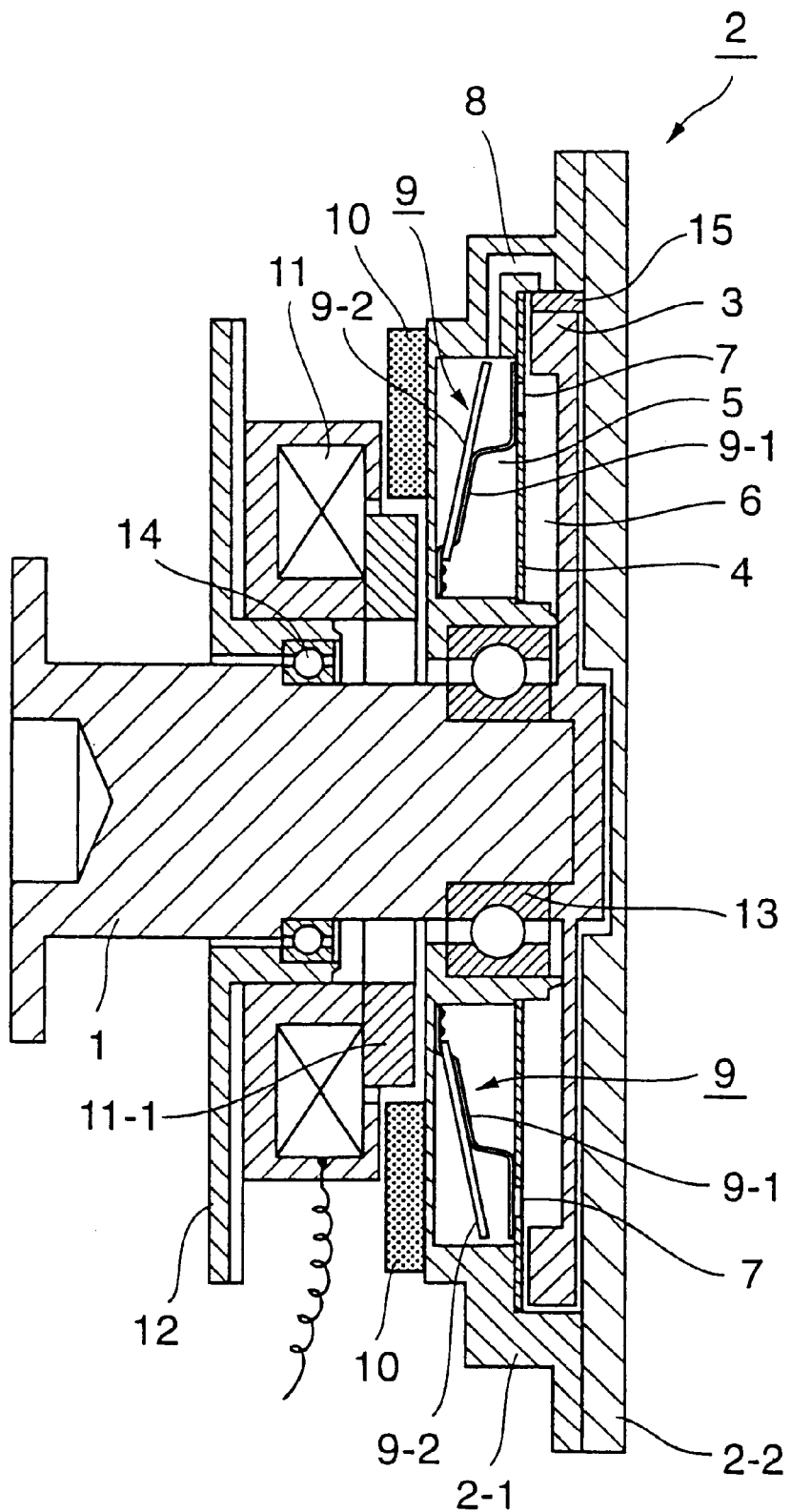
FIG. 8 is a vertical sectional view of an embodiment of an externally controlled fan coupling device having a double valve structure according to the invention.
Figure 10:
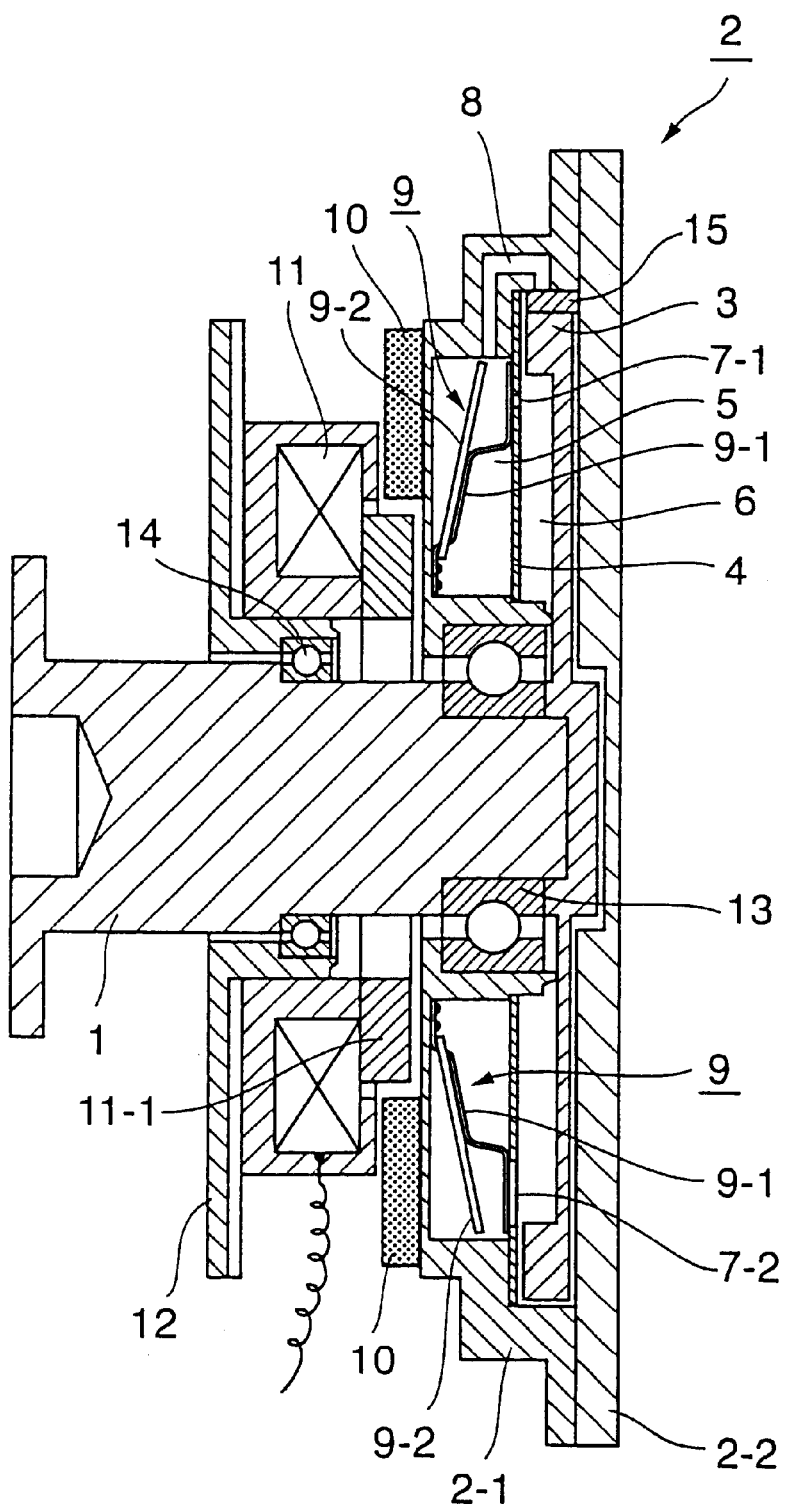
FIG. 10 is a vertical sectional view of another embodiment of an externally controlled fan coupling device having a double valve structure according to the invention.

The fan coupling devices shown in FIGS. 8 and 10 are the same in structure as the fan coupling device in a single valve structure shown in FIG. 1 except that there is provided two sets of oil supply adjusting holes 7, 7-1 and 7-2 and valve members 9 and two sets of mechanisms each constituted by a valve member 9 and a permanent magnet 10 for controlling the opening and closing of the oil supply adjusting holes 7, 7-1 and 7-2.

Specifically, in the fan coupling device having a double valve structure shown in FIG. 8, two oil supply adjusting holes 7 are provided at the partition plate 4 on a rectilinear diameter of the dame. The two oil supply adjusting holes 7 are provided at different distances from the center of the partition plate in the radial direction thereof. In the fan coupling device having a double valve structure shown in FIG. 10, oil supply adjusting holes 7-1 and 7-2 having different diameters are provided at the partition plate 4 and preferably on a rectilinear diameter thereof.

Each of the oil supply adjusting holes 7, 7-1 and 7-2 is provided with a valve member 9 which is constituted by a plate spring 9-1 and a magnetic piece 9-2 and which serves as a mechanism for opening and closing the respective oil supply adjusting hole 7, 7-1 or 7-2 using the plate spring 9-1 which is secured to an inner wall of the oil reservoir 5 at a base section thereof and to which a force toward the partition plate 4 is continually applied. In association with each valve member 9, a permanent magnet 10 which is paired with an electromagnet 11 provided in the driving section side of the sealed housing 2 is attached to an outer surface of the case 2-1 in a face-to-face relationship with the valve member 9. 11-1 represents a ring-shaped magnetic material.

The fan coupling devices in a double valve structure shown in FIGS. 8 and 10 having the above-described configuration are similar to the fan coupling device in a single valve structure shown in FIG. 1 in that when the electromagnet 11 is turned off or when a current is applied to the electromagnet 11 to generate a magnetic field in the same direction as that of a magnetic field generated by each of the permanent magnets 10, the magnetic pieces 9-2 of the valve members 9 are attracted by the action of the permanent magnets 10 against the plate springs 9-1 to open the oil supply adjusting holes 7, 7-1 and 7-2 and to maintain the open state. As a result, oil in the oil reservoir 5 is supplied to the torque transmission chamber 6 through the oil supply adjusting holes 7, 7-1 and 7-2 of the partition plate 4. The oil supplied to the torque transmission chamber 6 transmits driving torque of the driving disc 3 to the case 2-1 to increase the rotating speed of the cooling fan (not shown) attached to the case. On the contrary, when a current is applied to the electromagnet 11 to generate a magnetic field in a direction opposite to that of the magnetic fields generated by the permanent magnets 10, the magnetic fields of the permanent magnets 10 and electromagnet 11 are cancelled by each other to extinguish the attracting force of the permanent magnets 10. As a result, the valve members 9 are urged against the partition plate 4 by the force of the plate springs 9-1 to close the oil supply adjusting holes 7 and to maintain the closed state. Since the supply of oil from the oil reservoir 5 to the torque transmission chamber 6 is thus stopped and the oil in the torque transmission chamber 6 is returned to the oil reservoir 5 through the circulation channel 8 because of the presence of the dam 15, the torque transmission rate is decreased to reduce the rotating speed of the case 2-1, which results in a reduction of the speed of the cooling fan.

Figure 9:
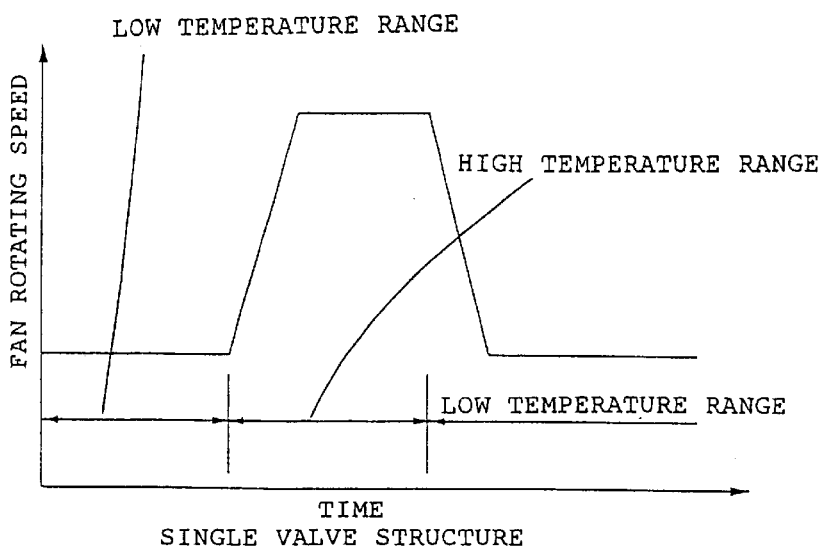
FIGS. 9A and 9B are characteristic diagrams that are comparative illustrations of relationships between fan rotation of and time in the single valve structure shown in FIG. 1 and the double valve structure shown in FIG. 8.
Figure 9:
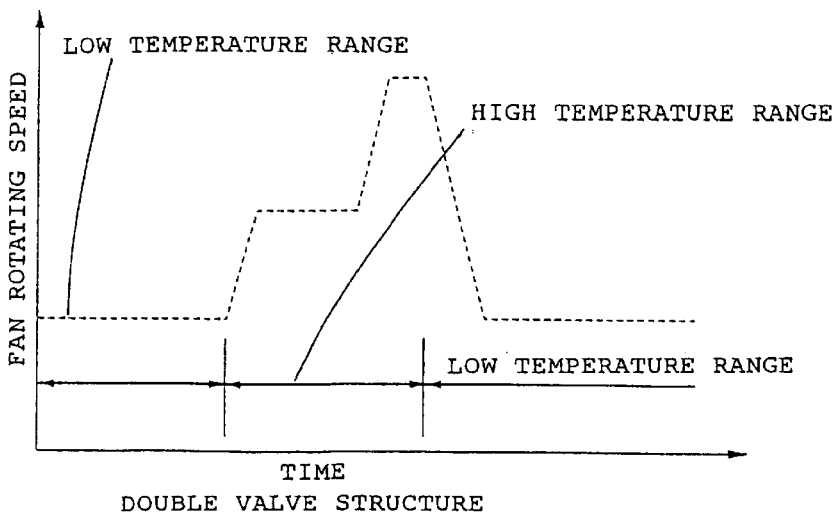

Each valve of a fan coupling device having a double valve structure is thus opened and closed through energization of the electromagnet 11, and the two valves can be opened and closed stepwise by changing the magnitude of the current to energize the electromagnet 11 for each valve stepwise. Specifically, referring to FIGS. 9A, 9B, 11A and 11B, while in the fan coupling device having a single valve structure shown in FIG. 1 in which an increase in the magnitude of the current to energize the electromagnet 11 causes the rotating speed of the cooling fan to jump to a predetermined rotating speed as indicated by the solid line, in the case of the fan coupling device having a double valve structure shown in FIG. 8, on the contrary, each valve can be opened and closed stepwise by changing the magnitude of the current to energize the electromagnet 11 stepwise or by changing the polarity (positive or negative polarity) of the power source. As a result, the rotating speed of the cooling fan can be increased stepwise to a predetermined rotating speed as indicated by the broken line in FIG. 9B. Therefore, the fan coupling device having a double valve structure allows the fan rotating speed to be controlled in various modes.

In the case of the fan coupling device having a double valve structure shown in FIG. 10, either or both of the valves having different diameters is simultaneously opened and closed to adjust the amount of supplied oil by changing the magnitude of the current to energize the electromagnet 11 stepwise or by changing the polarity (positive or negative polarity) of the power source, which makes it possible to change the rate of the increase in the fan rotating speed as indicated by the broken lines in FIGS. 11A and 11B (FIG. 11A shows a rate that is achieved when only the oil supply adjusting hole 7-1 in FIG. 10 is opened, and FIG. 11B shows a rate that is achieved when the oil supply adjusting holes 7-1 and 7-2 in FIG. 10 are opened).

A more specific description will now be made on the operation and effects of the valve opening/closing control system in the above-described fan coupling device having a double valve structure.

Figure 12:
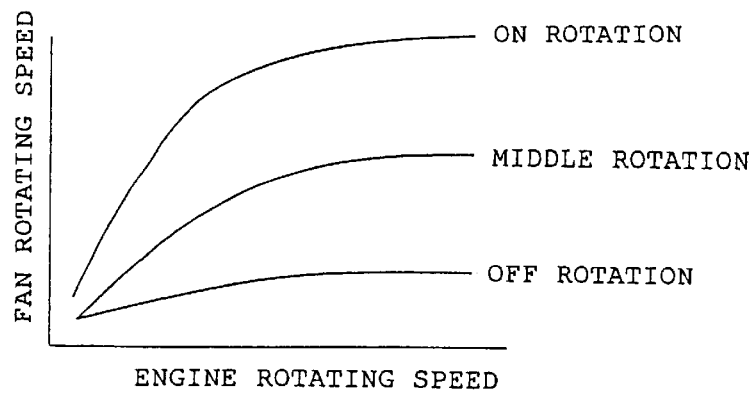
FIGS. 12A to 12C illustrate operations and effects of a valve opening/closing control system of a fan coupling device having a double valve structure according to the invention.
Figure 12:
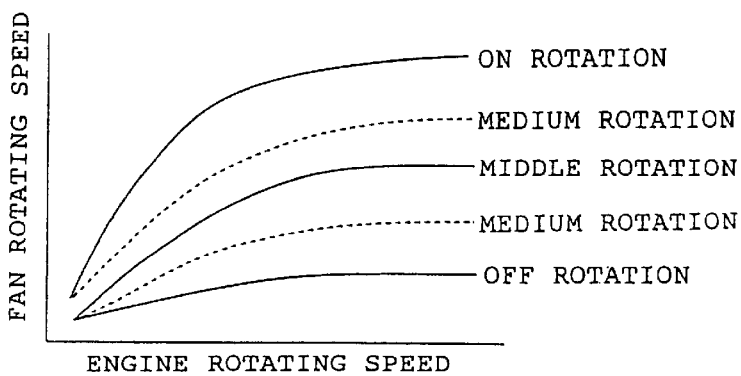
Figure 12:
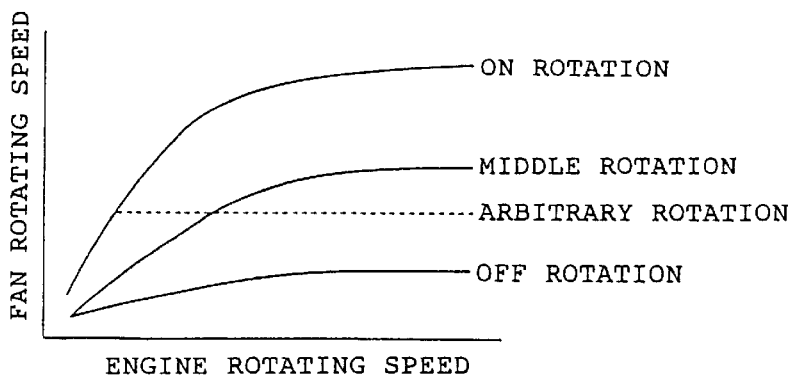
Figure 13:
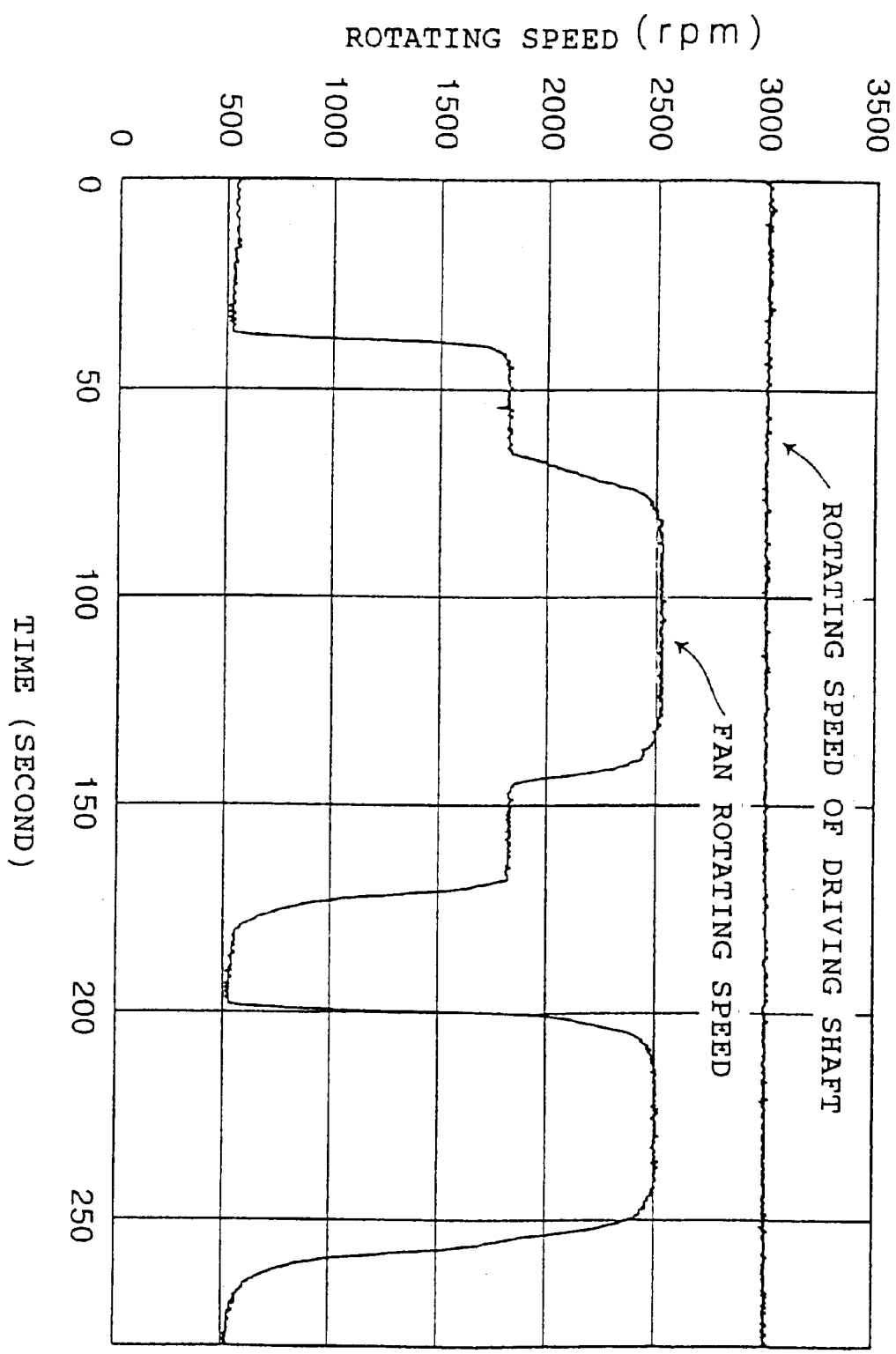
FIG. 13 is a diagram showing an example of control for achieving fan rotating speeds in three steps in the same device with the rotating speed of the driving shaft kept constant.

By providing the two valves at different distances in the radial direction for MIDDLE rotation and ON rotation, control can be performed to achieve <1> rotating speeds in three steps (FIG. 12A), <2> medium rotating speeds (FIG. 12B) and <3> an arbitrary rotating speed (FIG. 12C). The MIDDLE rotation can be achieved by opening only the valve for the MIDDLE rotation, and continuous transition from the MIDDLE rotation to the ON rotation can be achieved by opening the two valves, i.e., the valves for the MIDDLE rotation and ON rotation to achieve the ON rotation (FIG. 13).

<1> Control for Achieving Three Steps

As shown in FIG. 12A, control can be performed to achieve three stable patterns of rotation by applying a control signal having a single charge to one electromagnet. Specifically, the opening and closing of the two valves can be controlled by switching three voltage patterns, i.e., 0 V (Off), +12 V (On) and −12 V (On) to control the fan rotation to achieve three stable patterns of rotation, i.e., ON rotation (for which the voltage of +12 V is applied to open the two valves), MIDDLE rotation (for which the voltage of 0V is applied to open only the valve for MIDDLE rotation) and OFF rotation (for which the voltage of −12 V is applied to close the two valves). 12 V is the same voltage as a battery voltage.

<2> Control for Achieving Medium Rotating Speed

As shown in FIG. 12B, the two valves cab be switched at a predetermined duty rate (which is a pulse width in principle) to control the fan rotating speed to achieve a medium rotating speed located between the OFF rotation and MIDDLE rotation (which is achieved by control to open and close only the valve for MIDDLE rotation) and a medium rotating speed located between the MIDDLE rotation and ON rotation (which is achieved by control to close the valve for ON rotation with the valve for MIDDLE rotation in a full open state).

<3> Control for Achieving Arbitrary Rotating Speed

As shown in FIG. 12C, the difference between the relative rotating speeds of the driving shaft (rotating section) and the electromagnet (fixed section) can be measured using a magnetic pickup or the like. Thus, the rotating speed can be controlled with feedback of rotating speeds by opening and closing only the valve for the MIDDLE rotation when a specified rotating speed is located between the OFF rotation and MIDDLE rotation and by opening and closing the valve for the ON rotation with the valve for the MIDDLE rotation in a full open state when the specified rotating speed is located between the MIDDLE rotation and ON rotation.

FIG. 13 shows an example of control over fan rotation in which the system for control in three steps is used. The opening and closing of the two valves is controlled by switching three voltage patterns, i.e., 0 V (Off), +12 V (On) and −12 V (On), which allows stable control to achieve transitions from the OFF rotation to the MIDDLE rotation, from the MIDDLE rotation to the ON rotation, from the ON rotation to the MIDDLE rotation, from the MIDDLE rotation to the OFF rotation, from the OFF rotation to the ON rotation, and from the ON rotation to the OFF rotation with the rotating speed of the driving shaft kept constant.

Figure 14:
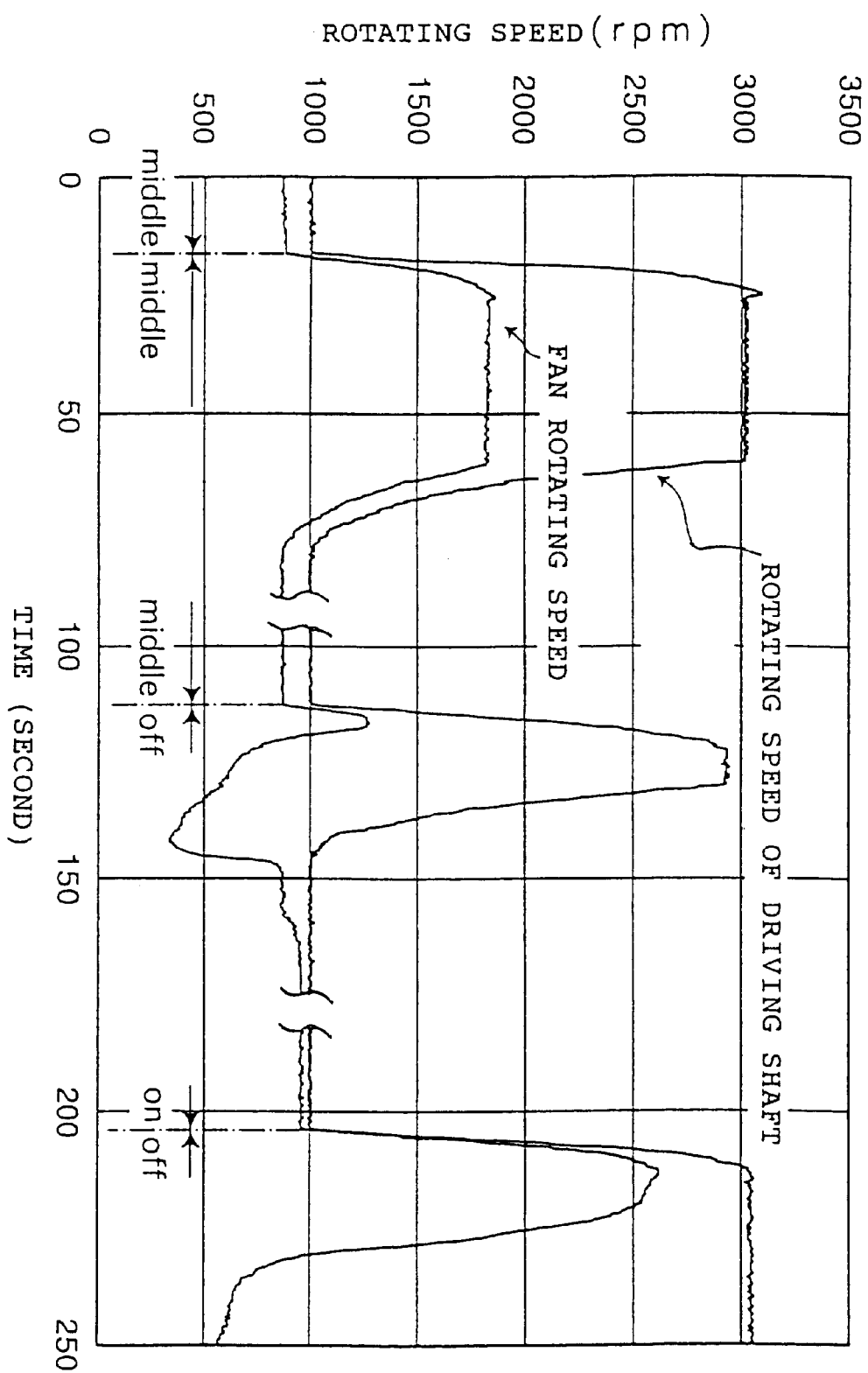
FIG. 14 is a diagram showing an example of control for preventing free running in the same device at the time of acceleration.

When the fan rotation is in the on state during idling as shown in FIG. 14, free running of the fan will occur during acceleration even if it is forcibly put in the off state by closing the valve. However, the double valve structure according to the invention makes it possible to prevent free running using the following methods.

(1) If only the valve for the MIDDLE rotation provided outside the disc in the radial direction thereof, since no excessive oil is supplied, the MIDDLE rotation can be maintained during acceleration without free running.

(2) If the Middle state is maintained during idling, since fan rotation can be instantaneously turned off by closing the valves at the time of acceleration, it is possible to prevent free running during acceleration.

Further, the fan rotating speed can be controlled by opening and closing the valves to achieve an arbitrary rotating speed as specified by providing feedback of fan rotating speeds (control for achieving arbitrary rotating speed).

That is, since the double valve structure has the valve for the MIDDLE rotation and the valve for the ON rotation which are separated from each other, the fan rotating speed is controlled by opening and closing the valve for MIDDLE rotation when specified rotation is between the OFF rotation and the MIDDLE rotation and opening and closing the valve for the ON rotation (with the valve for the MIDDLE rotation in a full open state) when specified rotation is between the MIDDLE rotation and the ON rotation. In this case, since each of the valves has a separate range of control, the width of hunting can be smaller than that encountered when the rotating speed is controlled with a single valve. Such control for achieving an arbitrary rotating speed provides the following advantages.

Figure 15:
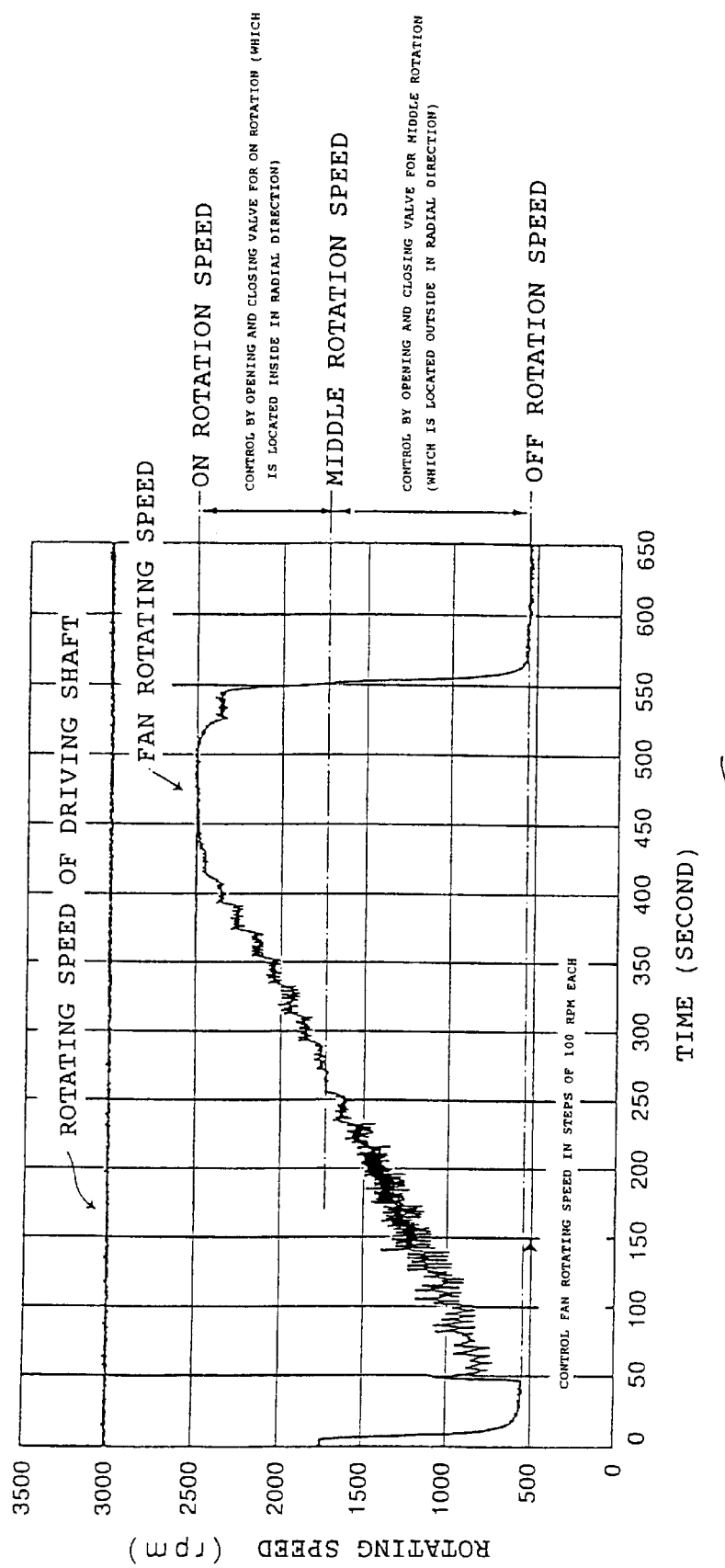
FIG. 15 is a diagram showing an example of control over the fan rotating speed of the same device when the engine rotating speed is kept constant at 3000 rpm.
Figure 16:
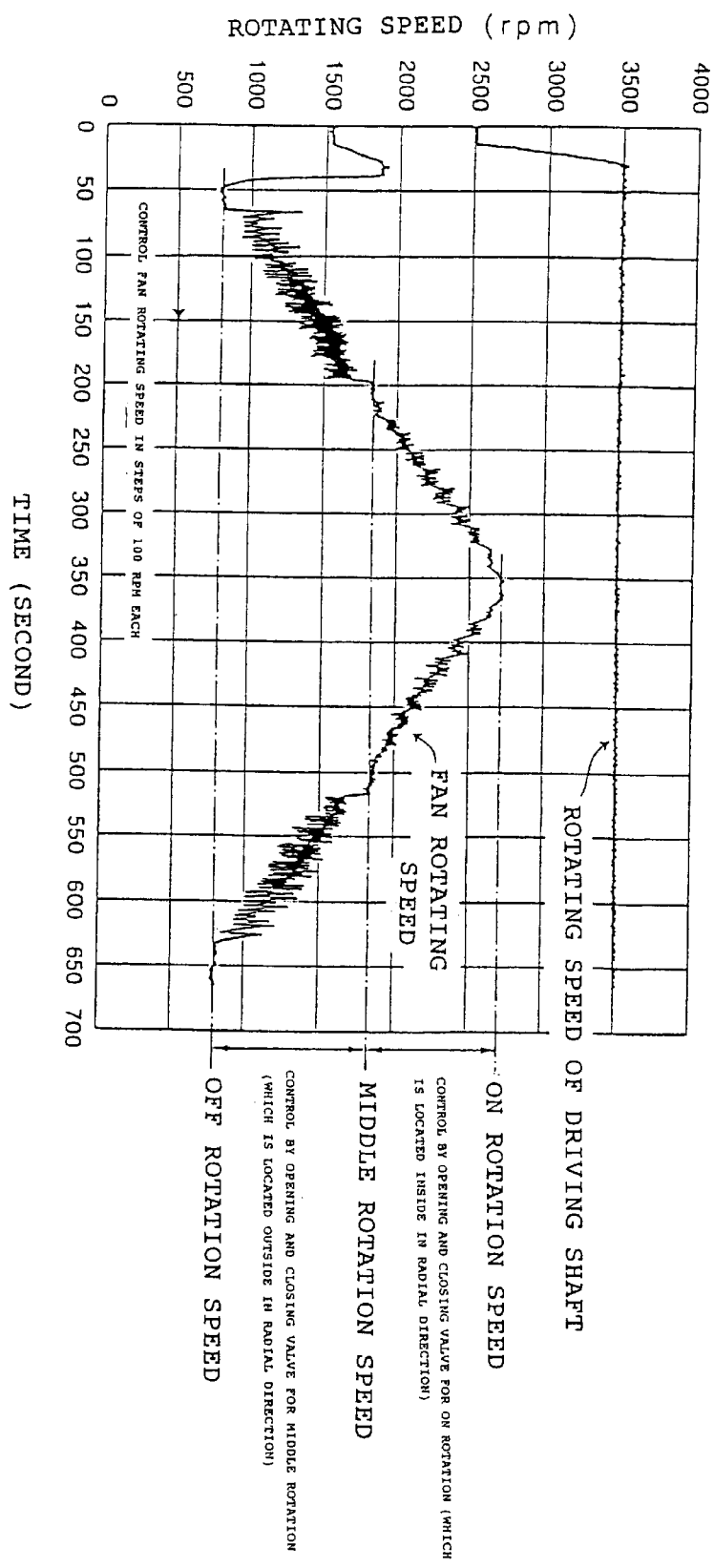
FIG. 16 is a diagram showing an example of control over the fan rotating speed when the engine rotating speed is kept constant at 3500 rpm.

(1) The fan rotation can be controlled and adjusted to any rotating speed from the off state to on state and from the on state to the off state with the rotating sped of the engine kept constant (300 rpm) (see FIGS. 15 and 16).

Figure 17:
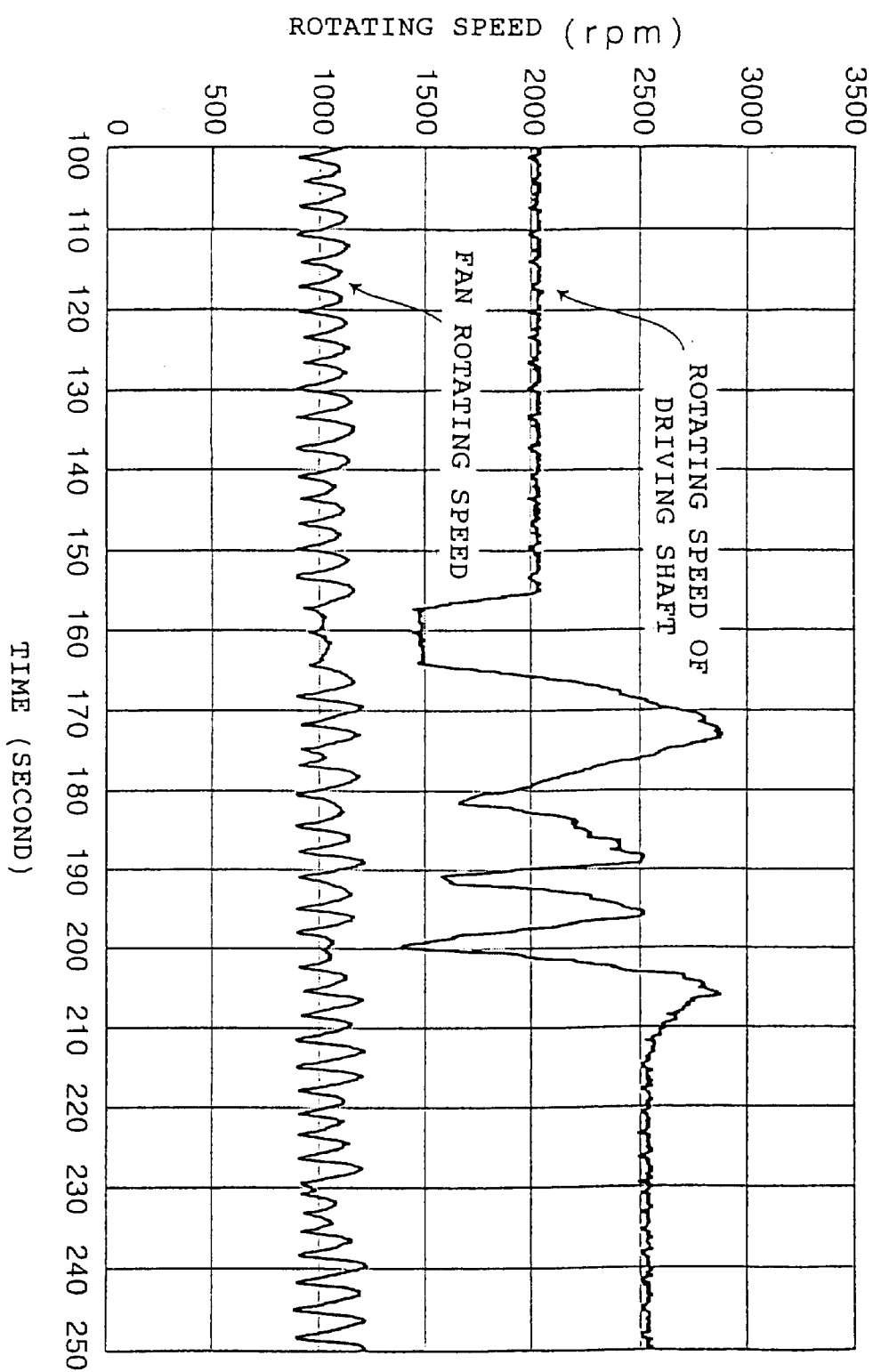
FIG. 17 is a diagram showing an example of control for keeping constant fan rotation in the same device when the engine rotating speed changes.

(2) The fan rotating speed can be always kept constant (e.g., at 1000 rpm) while the engine rotating speed is changing (see FIG. 17).

Figure 18:
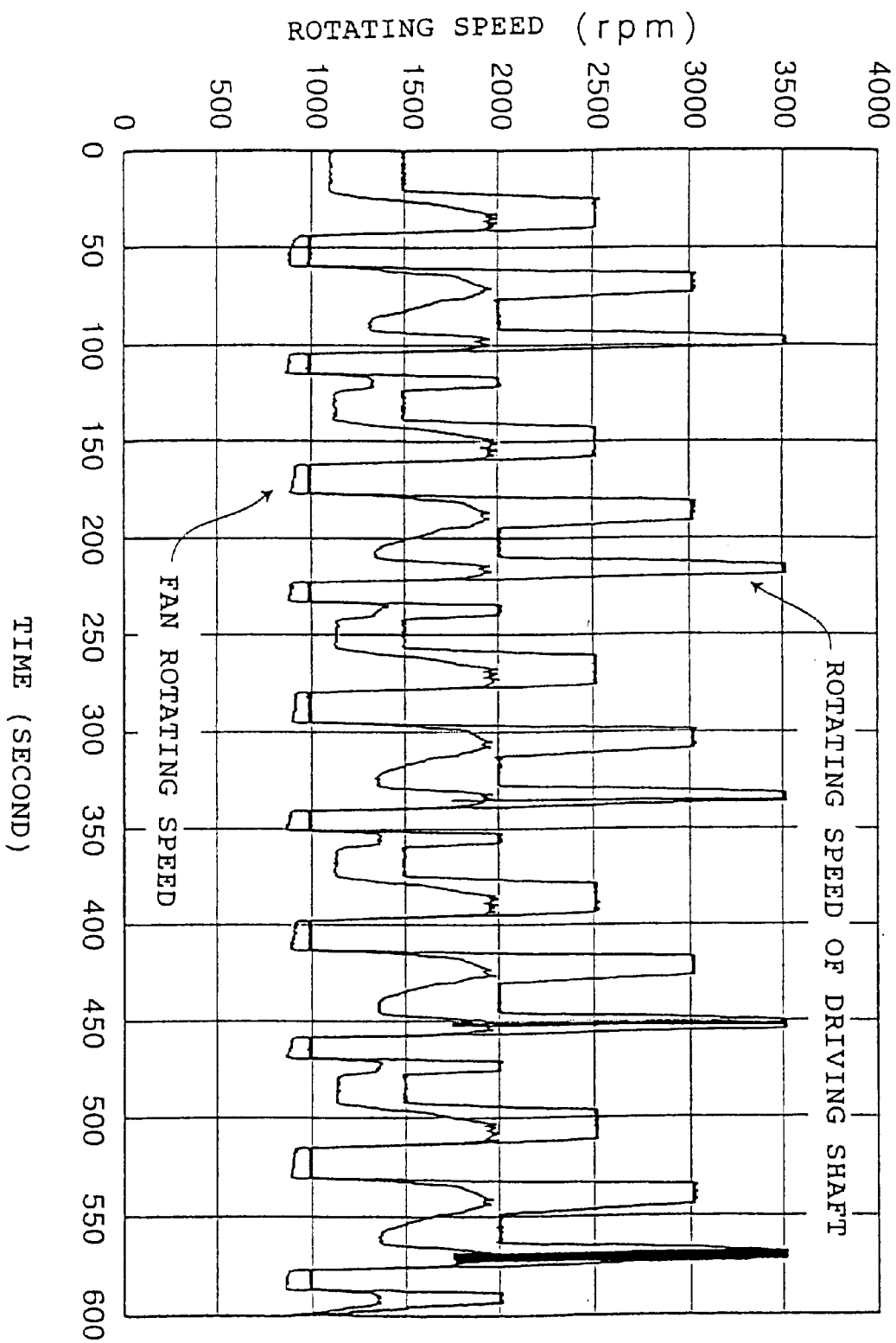
FIG. 18 is a diagram showing an example of control for maintaining an upper limit value of the fan rotating speed of the same device when the engine rotating speed changes.

(3) The fan rotating speed can be kept at an upper limit value (e.g., 2000 rpm) while the engine rotating speed is changing (see FIG. 18).

Figure 19:
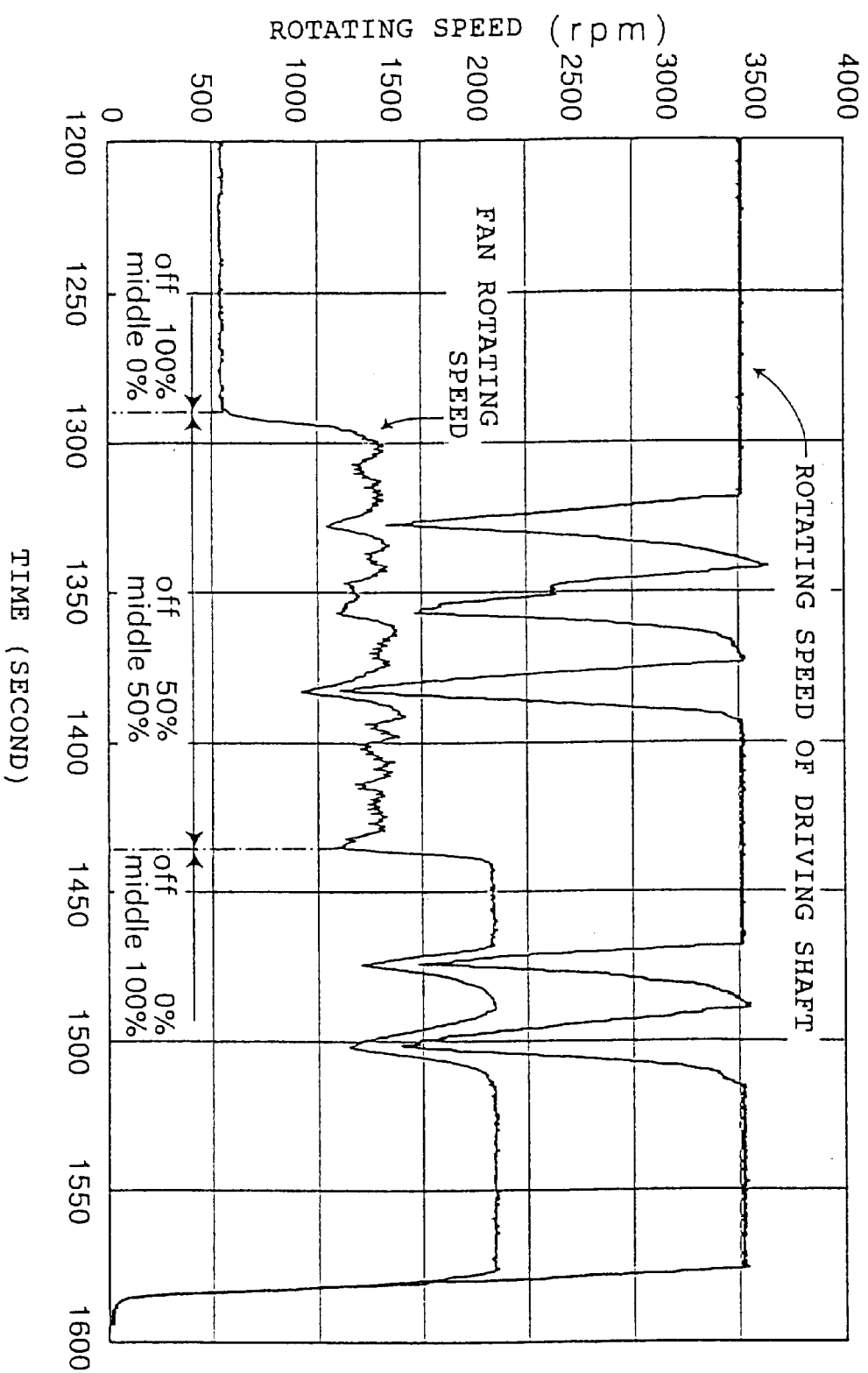
FIG. 19 is a diagram showing an example of control for maintaining the fan rotating speed of the same device at a medium rotating speed without performing feedback control.

(4) Rotations speeds between the OFF rotation and the MIDDLE rotation and between the MIDDLE rotation and the ON rotation can be maintained by opening and closing the valves at a certain duty rate without feedback of fan rotating speeds (see FIG. 19).

More stable control can be achieved by using the technique disclosed in Japanese patent publication No. 2000-74098 in the vicinity of the valve for the MIDDLE rotation at the oil reservoir.

As described above, the externally controlled fan coupling device according to the invention employs the system for controlling the valve member for opening and closing the oil supply adjusting hole using a combination of an electromagnet and a permanent magnet. As a result, even when the electromagnet is turned off due to a failure of the electrical system, the safety on effect can be advantageously achieved in that the operating oil is still circulated to prevent damage to the engine (overheating) because the oil supply adjusting hole provided on the partition plate is kept open. Further, the supply of oil to the torque transmission gap between the driving disc and the sealed housing can be quickly and accurately controlled in accordance with the driving conditions of the driving section, and the driving torque of the driving disc can be always transmitted to the driven side in an optimum state of transmission. Since the rotating speed of a cooling fan can therefore be controlled in accordance with various driving conditions, it is possible to reduce noises from the fan and to improve fuel consumption.

What is claimed is:

1. A temperature sensitive fluid fan coupling apparatus comprising:
   a rotary shaft having a rotational axis;
   a drive disc fixed to said rotary shaft being and rotatable therewith, the drive disc having an outer periphery;
   a sealed housing having an inner portion, said sealed housing being rotatably mounted on the rotary shaft such that the drive disc is within the inner portion of the sealed housing;
   a partition plate secured in the sealed housing and separating the inner portion of the sealed housing into an oil reservoir and a torque transmission chamber, such that the drive disc is disposed in the torque transmission chamber;

a dam formed on the sealed housing at a location in the torque transmission chamber opposed to the outer periphery of the drive disc;

an oil circulating flow passage extending from a location in the torque transmission chamber adjacent the dam to a location in the oil reservoir;

an oil supply hole formed through the partition plate and extending from the oil reservoir to the torque transmission chamber;

a valve member in the oil reservoir for selectively opening and closing the supply hole;

a non-excited electromagnet located outside the sealed housing, the electromagnet being supported around the rotary shaft by a bearing, and a permanent magnet disposed between the electromagnet and the seal housing, the electromagnet being operative to actuate the valve member for controlling opening and closing of the oil supply adjusting hole.

2. The fluid fan coupling apparatus of claim 1, wherein the permanent magnet is attached to the sealed housing.

3. The fluid fan coupling apparatus of claim 1, wherein the valve member comprises a plate spring and a magnetic piece secured to the plate spring.

4. The fluid fan coupling apparatus of claim 1, wherein the valve member comprises a coil spring and a magnetic piece secured to the coil spring.

5. The fluid fan coupling apparatus of claim 1, wherein the sealed housing is made of a non-magnetic material.

6. The fluid fan coupling apparatus of claim 1, wherein all of the valve member is disposed radially outwardly from the rotary shaft.

7. The fluid fan coupling apparatus of claim 1, wherein the valve member comprises a piece formed from a material responsive to magnetic forces of the permanent magnet.

8. A temperature sensitive fluid fan coupling apparatus comprising:

a rotary shaft having a rotational axis;

a drive disc fixed to said rotary shaft being and rotatable therewith, the drive disc having an outer periphery;

a sealed housing having an inner portion, said sealed housing being rotatably mounted on the rotary shaft such that the drive disc is within the inner portion of the sealed housing;

a partition plate secured in the sealed housing and separating the inner portion of the sealed housing into an oil reservoir and a torque transmission chamber, such that the drive disc is disposed in the torque transmission chamber;

a dam formed on the sealed housing at a location in the torque transmission chamber opposed to the outer periphery of the drive disc;

an oil circulating flow passage extending from a location in the torque transmission chamber adjacent the dam to a location in the oil reservoir;

an oil supply hole formed through the partition plate and extending from the oil reservoir to the torque transmission chamber;

a valve member in the oil reservoir for selectively opening and closing the supply hole;

a non-excited electromagnet located outside the sealed housing, the electromagnet being supported around the rotary shaft by a bearing, and a permanent magnet being disposed between the electromagnet and the seal housing, the electromagnet being operative to actuate the valve member for controlling opening and closing of the oil supply adjusting hole and a permanent magnet attached to the electromagnet and disposed between the electromagnet and the sealed housing, the electromagnet being operative to actuate the valve member for controlling opening and closing of the oil supply adjusting hole.

* * * * *